Oct. 8, 1929.  W. S. BRUBAKER  1,730,914
RESETTABLE REGISTER
Filed Dec. 23, 1926  2 Sheets-Sheet 1
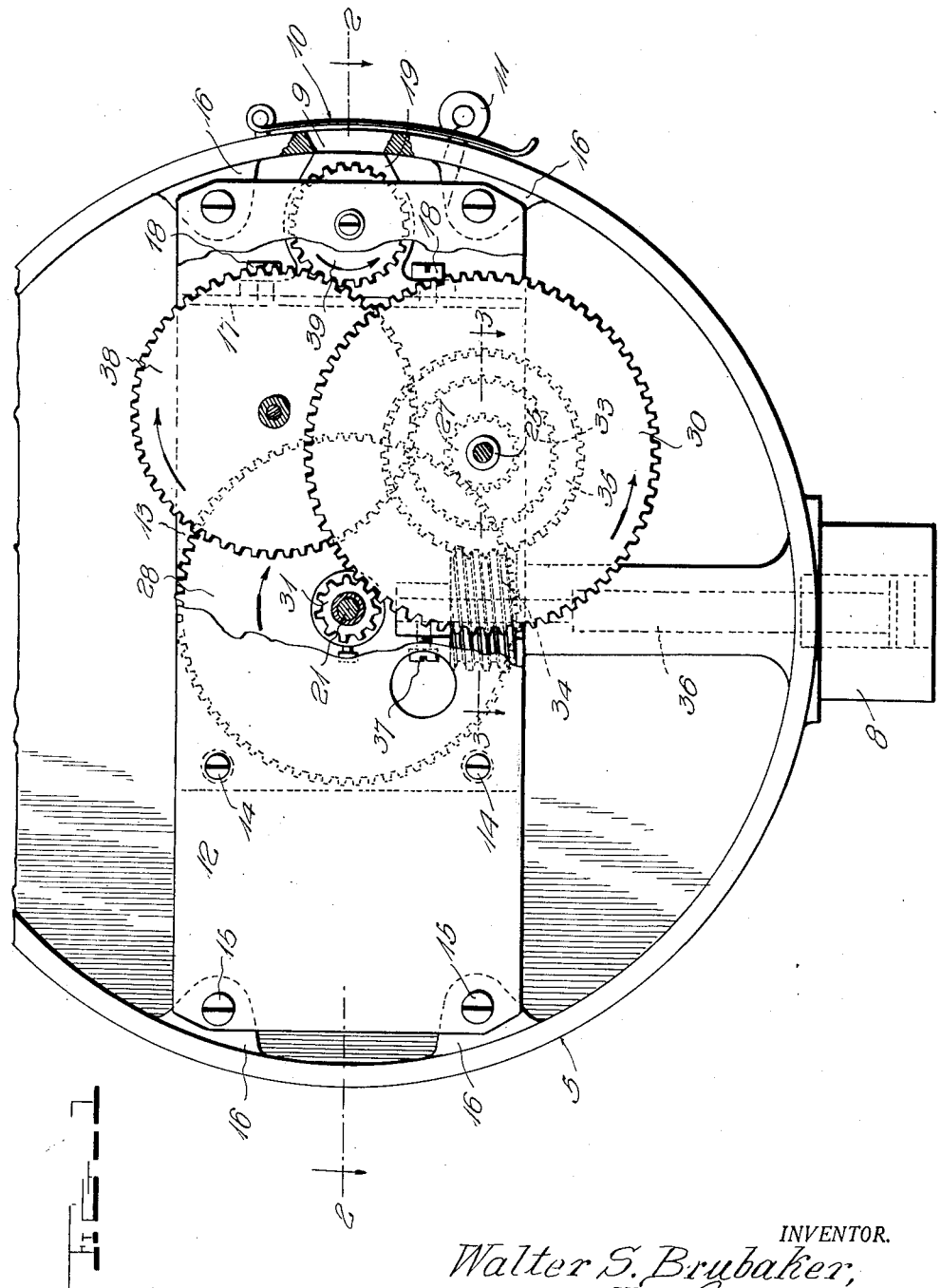
INVENTOR.
Walter S. Brubaker,
BY
ATTORNEY.

Oct. 8, 1929.　　　W. S. BRUBAKER　　　1,730,914
RESETTABLE REGISTER
Filed Dec. 23, 1926　　　2 Sheets-Sheet 2
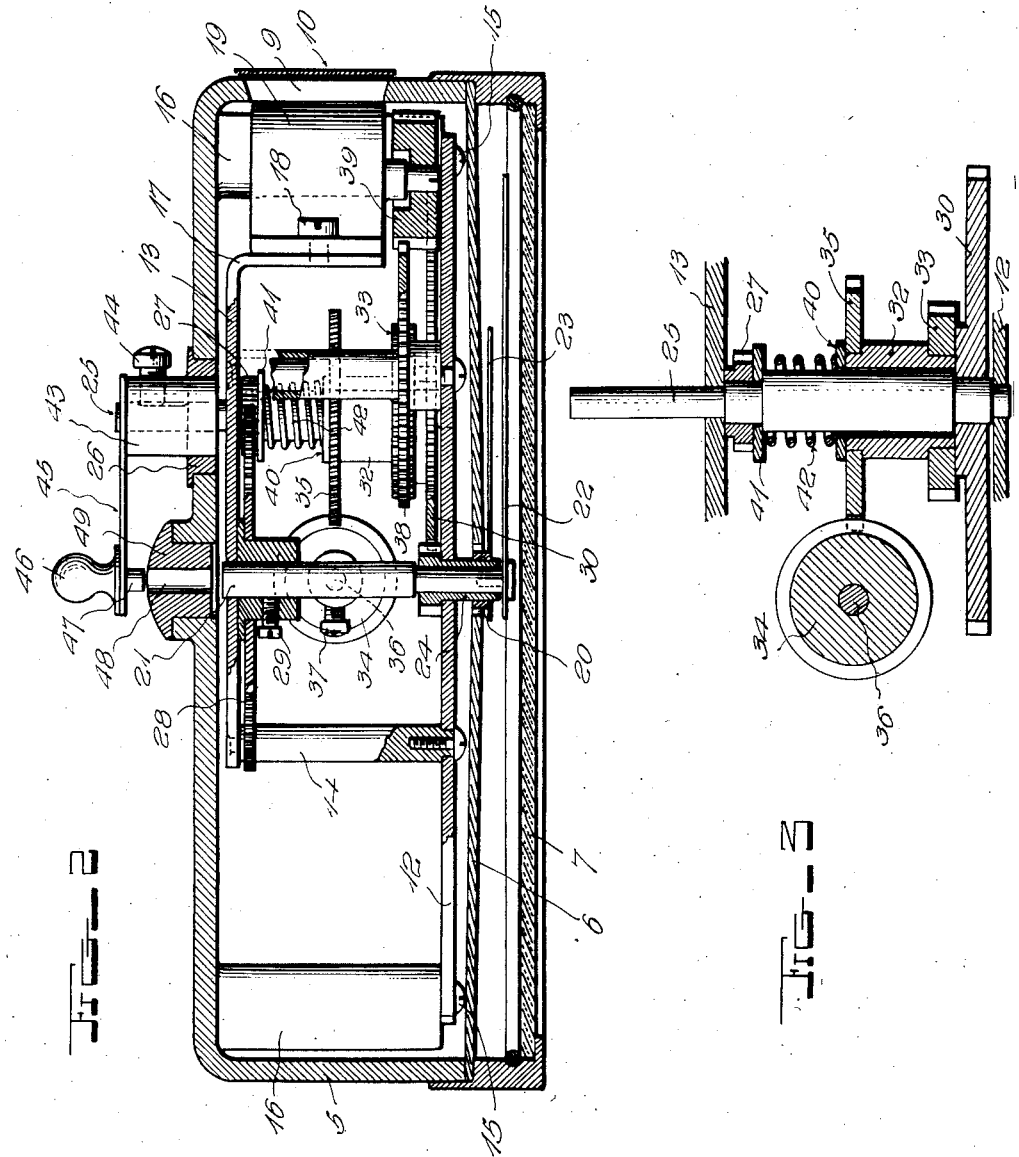
INVENTOR.
Walter S. Brubaker,
BY
ATTORNEY.

Patented Oct. 8, 1929

1,730,914

UNITED STATES PATENT OFFICE

WALTER S. BRUBAKER, OF OAKLAND, CALIFORNIA, ASSIGNOR, BY MESNE ASSIGNMENTS, TO GRANBERG METER CORPORATION, OF SAN FRANCISCO, CALIFORNIA, A CORPORATION OF CALIFORNIA

RESETTABLE REGISTER

Application filed December 23, 1926. Serial No. 156,682.

The invention relates to registers intended primarily for use with liquid volume meters, though not restricted to this particular field of use. The present disclosure is directed to a register of a type having two resettable pointers co-operable with concentric dials, one pointer registering over a range of one or several units, and the other pointer registering over a range which is a multiple of the first, said register having also a totalizer for showing at any time, the total number of units registered prior to such time.

It is one object of the invention to generally improve, simplify and condense registers of the type above referred to, providing one possessing extreme simplicity and accuracy and one having practically no liability to get out of order.

A further aim is to make novel provision whereby the registering means may be reset to zero after each actuation thereof, without disturbing the reading of the totalizer.

A still further aim is to provide unique means insuring easy and accurate resetting of the registering means to zero.

Yet another object is to provide novel means for driving the totalizer and holding it against any change while the unit registering means is being reset to zero.

An additional aim is to make novel provision for mounting the totalizer upon a frame structure within the register casing, in position to be readily visible through an opening in said casing.

With the foregoing and minor objects in view, the invention resides in the novel subject matter hereinafter described and claimed, the description being supplemented by the accompanying drawings.

Fig. 1 is a front elevation with the dial and the pointers removed.

Fig. 2 is a horizontal section substantially on line 2—2 of Fig. 1.

Fig. 3 is an additional horizontal sectional view substantially on line 3—3 of Fig. 1.

The form of construction selected for illustration in the present application will be rather specifically described, with the understanding at the outset, that within the scope of the invention as claimed, variations may be made.

The numeral 5 designates a cylindrical casing which is rather shallow from front to rear and is disposed with said front and rear in vertical planes. The front of this casing is provided with a dial plate 6 and with an imperforate glass cover 7 therefor; the bottom of the casing is provided with a vertically disposed bearing 8 by means of which it may be mounted upon a meter or other desired support, and one side of the casing is formed with a lateral opening 9, which opening is preferably closed normally, by a hinged plate 10 which may be held in closed position by a lock or seal engaged with the eye 11. When this plate is released and swung aside, a totalizer hereinafter described, may be read through the opening 9.

A frame structure is provided to support a number of movable parts within the casing 5, said frame structure preferably comprising a vertically disposed front plate 12, a relatively small back plate 13, and appropriate connectors 14 between the two plates. The front plate 12 is preferably secured by screws 15 to suitable bosses 16 formed within the casing 5. One end of the back plate 13 is bent laterally at 17 and is disposed in inwardly spaced relation with the opening 9, and by means of screws or the like 18, a totalizer 19 is secured upon this laterally bent plate end, the face of said totalizer being disposed at the opening 9 so that it may be read through the latter, when the cover 10 is moved aside.

Mounted in appropriate bearing openings in the plates 12 and 13 and passing through a central opening 20 in the dial plate 6 is a pointer-carrying shaft 21, the pointer of this shaft being indicated at 22, said pointer being at the front side of the dial plate 6 and being relatively long. A comparatively short pointer 23 is carried by a sleeve 24 which is rotatable upon the front end of the shaft 21 and passes also through the opening 20. The two pointers 22 and 23 of course co-operate with concentric dials upon the plate 6, and in the present instance one of them registering over a range of one or several units and the other registering over a range which is a multiple of that of the first.

Disposed somewhat below the shaft 21, parallel with said shaft, and offset laterally from the upper end of the bearing 8, which bearing rises into the casing 5, is a countershaft 25 which is rotatable in appropriate bearing openings in the plates 12 and 13, the rear end of said shaft 25 being passed through an opening 26 in the rear wall of the casing 5 for a purpose to appear. Secured upon this shaft, near its rear end, is a pinion 27 which meshes with a gear 28, the latter being secured upon the rear end of the shaft 21, for instance by a set screw 29. Secured upon the front end of shaft 25 is a gear 30 meshing with a pinion 31 on the pointer-carrying sleeve 24. It will thus be seen that when the two parallel shafts 21 and 25 are driven, the two pointers 22 and 23 will move at different properly timed speeds.

A totalizer-driving sleeve 32 is loose upon the portion of the shaft 25 between the pinion 27 and the gear 30, one end of said sleeve abutting the rear side of the gear 30 and having a gear 33, while the other end of said sleeve is forwardly spaced from the pinion 27, and is provided with a worm gear 35. This worm gear meshes with a worm 34 secured upon the upper end of a drive shaft 36 by a set-screw 37, said drive shaft being rotatably mounted in the bearing 8. The gear 33 meshes with an appropriate idle gear 38, and this gear in turn meshes with a gear 39 secured upon the shaft of the totalizer 19. It will thus be seen that rotation of the shaft 36, causes the worm 34 and the worm gear 35, to rotate the sleeve 32, thereby causing the gears 33, 38 and 39, to drive the totalizer 19. A frictional driving connection is provided between the sleeve 32 and the shaft 25, so that driving of said sleeve will also drive said shaft, and the latter will in turn drive the two pointers 22 and 23, through the instrumentality of the parts 27, 28, 21, 30, 31 and 24. However, when the two parallel shafts 21 and 25 are to be turned by hand to reset the pointers 22 and 23 at zero, the frictional driving connection in question, permits said shaft 25 to turn within the sleeve 32, then held by worm 34 and worm gear 35, so that the shaft 36 and the totalizer 19 remain unaffected.

The frictional driving connection above referred to, is preferably of the construction shown most clearly in Fig. 3.

Contacting with the inner end of the sleeve 32 is a clutch disk or washer 40, and another washer 41 contacts with the inner or front side of the pinion 27. Between these two washers 40 and 41, a coiled compression spring 42 surrounds the shaft 25 and exerts a forward pressure on the sleeve 32 holding the disk 40 against said sleeve and holding the latter frictionally against the gear 30. This frictional driving connection is sufficient to cause the positive driving of the sleeve 32 by the worm 34 and worm gear 35, to also drive the shaft 25 to in turn drive the pointers 22 and 23, yet when manual resetting of the pointers to zero is to be effected, the shaft 25 may readily turn within the sleeve 32. For so turning the shaft 25, I prefer to employ the construction described below.

A hub 43 is secured upon the projecting rear end of the shaft 25, by a set screw 44, and a spring arm 45 provided with a knob 46, is secured to and projects laterally from said hub, providing a crank by means of which the shaft 25 may be rotated, and due to the gearing above described, rotation of this shaft will also rotate the shaft 21 and the sleeve 24, to reset the pointers 22 and 23. In the present showing, the inner side of the arm 45 is provided with a projecting stud 47, which stud may be forced by hand into a recess or socket 48 in a rearward projection 49 on the casing 5, when the pointers 22 and 23 have reached their zero setting. The person setting the register at zero, knows that when the crank 45—46 has been turned to the position at which the stud 47 may be forced into the socket 48, accurate zero setting of the pointers has been attained. When he releases the crank, its inherent resiliency causes it to spring outwardly, withdrawing the stud 47 from the socket 48.

It will be observed by those skilled in the art that the general construction and arrangement of parts herein disclosed is exceptionally simple and compact, when compared with mechanisms which have heretofore been devised for attaining the same results. All operating parts may be quickly and easily taken from the casing whenever any repairs are necessary, simply by removing the plates 6 and 7, detaching the crank 45—46, lowering the shaft 36, removing the worm 34 and removing the screws 15. All operating parts are thus readily accessible for any repairs or adjustments which may be necessary and reassembly may be effected with equal ease.

On account of the advantages flowing from the details herein disclosed, they are preferably followed. However, within the scope of the invention as claimed, variations may be made, as above stated.

I claim:—

1. In a register, an upright drive shaft having a worm at its upper end, a horizontal pointer-carrying shaft above said drive shaft, a countershaft laterally offset from the aforesaid worm and parallel with said pointer-carrying shaft, said countershaft connected through gearing to said pointer-carrying shaft at one end thereof and adapted to drive the latter, a pointer-carrying sleeve rotatable on the other end of said pointer-carrying shaft, additional gearing connecting the other end of the countershaft with said sleeve, a worm gear loose upon said countershaft between the first and second named gearing and meshing with the aforesaid worm, a frictional driving connection between said worm gear and said countershaft, and means on said countershaft to effect zero setting of the two pointers, said frictional driving connection permitting turning of the countershaft in said worm gear during such zero setting.

2. In a register, an upright drive shaft having a worm at its upper end, a horizontal pointer-carrying shaft above said drive shaft, a countershaft laterally offset from the aforesaid worm and parallel with said pointer-carrying shaft, said countershaft connected through gearing to said pointer-carrying shaft at one end thereof and adapted to drive the latter, a pointer-carrying sleeve rotatable on the other end of said pointer-carrying shaft, additional gearing connecting the other end of said countershaft with said sleeve, a second sleeve loose upon said countershaft and having a worm gear meshing with the aforesaid worm, a totalizer laterally offset from said countershaft, gearing connecting said totalizer with said second sleeve a frictional driving connection between said second sleeve and said countershaft, and means on said countershaft to effect zero setting of the two pointers, said frictional driving connection permitting turning of said countershaft within said second sleeve during such setting, said second sleeve and said totalizer being then held against rotation by the worm and worm gear.

3. In a register, a pointer-carrying shaft, a pointer-carrying sleeve rotatable thereon, a countershaft parallel with said pointer-carrying shaft and having positive driving connections with the latter and with the pointer-carrying sleeve, a second sleeve loose upon said countershaft, a worm and worm gear for driving said second sleeve, a totalizer having a positive driving connection with said second sleeve, a frictional driving connection between said second sleeve and said countershaft, and means on said countershaft for effecting zero setting of the two pointers, said frictional driving connection permitting rotation of the countershaft in the second sleeve during such setting, while said second sleeve and said totalizer are held by said worm gear against rotation.

4. In a resettable register, a shaft capable of manual rotation, pointer-driving gears fixed to said shaft at longitudinally spaced points, a totalizer-driving sleeve loose upon said shaft between said gears, said sleeve abutting one of said gears but being spaced from the other gear, spring means surrounding the shaft between said sleeve and said other gear and serving to frictionally hold the sleeve against said one gear to establish a frictional driving connection between the sleeve and shaft, and means for driving said sleeve and for holding it against rotation when the drive is discontinued, whereby the shaft may be manually turned within the sleeve to effect pointer-setting at zero position without changing the reading of the totalizer.

In testimony whereof I have hereunto affixed my signature.

WALTER S. BRUBAKER.